United States Patent [19]
Dian

[11] 3,903,751
[45] Sept. 9, 1975

[54] BICYCLE DERAILLER WITH OVERLOAD CABLE PROTECTION MEANS

[75] Inventor: Walter Dian, Downers Grove, Ill.

[73] Assignee: Beatrice Foods Co., Elgin, Ill.

[22] Filed: Apr. 24, 1974

[21] Appl. No.: 463,677

[52] U.S. Cl.... 74/217 B; 74/242.11 B; 74/242.15 B
[51] Int. Cl............................................. F16h 11/04
[58] Field of Search ...... 74/217 B, 242.4, 242.11 B, 74/242.14 B, 242.15 B, 469, 491

[56] References Cited
UNITED STATES PATENTS
3,803,933  4/1974  Huret et al. .................. 74/217 B FOREIGN PATENTS OR APPLICATIONS
878,199  9/1961  United Kingdom .............. 74/217 B Primary Examiner—Samuel Scott
Assistant Examiner—Allan R. Burke
Attorney, Agent, or Firm—Hill, Gross, Simpson, Van Santen, Steadman, Chiara & Simpson

[57] ABSTRACT

A derailler for bicycles for moving the chain to sprocket wheels of varying diameters in which the control mechanism of the derailler includes a spring loaded linkage such that if the actuating cable is moved while the bicycle is not moving, the cable will not be subjected to stretching and breaking, but a spring loaded linkage allows the cable to move and exerts a spring bias on the derailler such that shifting occurs after the bicycle is placed in motion thus preventing injury and breakage to the mechanism.

6 Claims, 5 Drawing Figures

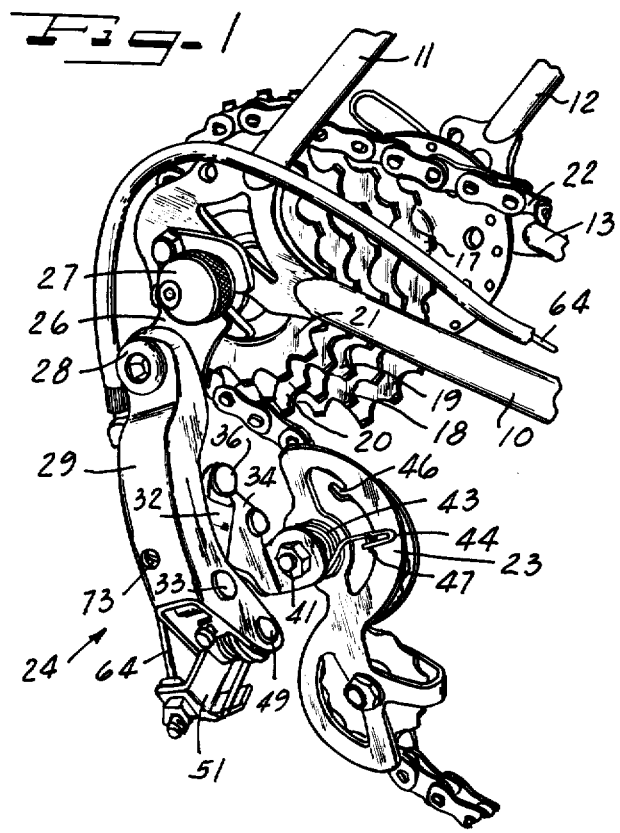

BICYCLE DERAILLER WITH OVERLOAD CABLE PROTECTION MEANS

BACKGROUND OF THE INVENTION

1. Field of the Invention

This invention relates in general to deraillers for bicycles and in particular to a new, improved derailler mechanism.

2. Description of the Prior Art

Derailler mechanisms for moving the chain of a bicycle between sprocket wheels having different diameters have been known and such mechanisms are actuated by an actuating cable which moves a mechanical linkage that controls the lateral position of a roller cage through which the chain passes so as to shift the chain between the various sprocket wheels. When the bicycle is not moving, the spring is locked transverse to the bicycle by the engagement of the sprocket teeth with the chain and with mechanisms of the prior art, when the actuating cable is energized at times when the bicycle is stationary, stretching of the actuating cable or breaking of the actuating cable or mechanism occurs. Written instructions are generally provided which advise the user not to shift the derailler when the bicycle is stopped and the sprocket wheels are not rotating, however, with children and others, attempts are made to shift the derailler under conditions when it is locked, and thus, breaking and stretching of the cable occurs.

SUMMARY OF THE INVENTION

The present invention provides an improved derailler mechanism which, in addition to providing the normal functions of a derailler while the bicycle is in motion, further provides a fail-safe spring-loaded mechanism wherein if the actuating cable is moved while the bicycle is stationary and the cable and sprocket teeth are in a locked position, rather than breaking or stretching the cable, the spring-loaded mechanism will allow the cable to move relative to the derailler thus taking the desired shifted position and a spring bias will be applied to the derailler by the cable such that shifting of the mechanism will occur as soon as the bicycle starts to move and the sprocket teeth and the chain are in the unlocked position. Thus, the present invention provides not only for shifting of the bicycle under conditions which present deraillers do not allow but also prevents breakage of the mechanism and stretching and deforming of the cable.

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

BRIEF DESCRIPTION OF THE DRAWING

FIG. 1 is a perspective view of the derailler of the invention.

FIG. 2 is a front plan view of the derailler of the invention.

FIG. 3 is a front view of the derailler of the invention in a shifted position.

FIG. 4 is an enlarged cutaway view of the mechanism of the invention, and

FIG. 5 is a detailed view taken on section lines illustrated in FIG. 4.

DESCRIPTION OF THE PREFERRED EMBODIMENTS

In FIGS. 1, 2, and 3, the rear wheel supporting portion of the frame of a bicycle is illustrated and is designated by numerals 10, 11, 12, and 13. The rear wheel hub 14 including the spokes 16 are rotatably supported on the axle and the frame. Sprocket wheels 17, 18, 19, 20, and 21 are also connected to the rear wheel to drive it through the chain 22. The chain 22 passes over the roller cage 23 of the derailler mechanism of the invention designated generally as 24. The derailler mechanism is connected to the bicycle frame by a supporting bracket 26 which is formed with a slot which fits about the axle and which threadily receives a nut 27 that locks the derailler to the bicycle frame.

The member 26 is connected by a suitable bolt and nut arrangement 28 to the derailler housing member 29. The derailler housing member 29 is generally channel shaped and pivotally supports the parallelogram derailler actuating mechanism which supports the roller cage 23 to move the chain 22. The parallelogram mechanism designated generally as 31 comprises a first link 32 which has its lower end connected by pivot pin 33 to the lower end of the housing 29. A second link 34 has one end pivotally connected to the upper end of link 32 by pivot pin 36 and is pivotally connected to a linkage 37 by pivot pin 38. The roller cage 23 is rotatably supported by a nut and bolt arrangement 41 from the portion 42 of link 34. A spring 43 is mounted about the bolt 41 and has an end 44 engageable with hooks 46 or 47 on the roller cage 23 as best shown in FIG. 1. The lower end of link 37 is pivotally connected to the lower end 48 of the housing 29 by pivot pin 49. An actuating member 51 is pivotally supported by pivot pin 49 adjacent the linkage 37. A pair of double springs 52 and 53 have first ends 54 and 56, respectively, which bear against a transverse extension 57 of actuating linkage 51. The second end 58 of spring 52 bears against the linkage 37 and spring biases it relative to the actuating linkage 51 such that under normal operating conditions when the roller cage is not prevented from moving transversely of the sprocket wheels, the members 37 and 51 will move together thus allowing the actuating lever 51 to move the parallelogram 31 through the linkage 37 to shift it. The second end 61 of spring 53 engages a stop 62 of the lower portion 48 of the housing 29 so as to spring bias the mechanism in a clockwise direction relative to FIG. 3.

The actuating cable 64 is covered with a suitable protective casing and passes through a guide 66 mounted on the housing 29, and the cable 64 is connected at its lower end to the actuating lever 51 by a suitable nut and bolt 67.

The springs 52 and 53 are selected such that at times when the roller cage is not prevented from moving transversely of the bicycle, as for example when the bicycle is moving forward with the chain moving over the sprocket wheels, the members 51 and 37 act as a single actuating lever for the parallelogram to control the position of the roller cage and shift the chain on the sprocket wheels.

On the other hand, if the bicycle is not moving and the chain locks the roller cage so that it cannot move transversely of the bicycle, then the members 37 and 51 move relative to each other about the pivot point 49 with the member 37 maintaining its stationary position such that the roller cage 23 does not move transversely but the actuating lever 51 moves under control of the cable 64 against the spring which has its end 58 bearing against the member 37. The member 37 is formed with a limit stop 71 best shown in FIG. 4 which limits the motion of the members 37 and 51 in a first direction and an adjusting screw 72 is mounted in a bracket 73 of the housing 29 and is threadily received in the bracket 73 and the housing is formed with an opening through which the head of the bolt 73 can be adjusted as shown in FIGS. 1 and 4, for example. The bolt 72 engages the member 37 to limit its clockwise rotation relative to FIG. 4. A second adjustment screw 76 is mounted in the lower portion of the housing 29 and is positioned so as to engage a stop 77 on the linkage 32 so as to limit its counterclockwise rotation relative to FIG. 3.

In operation with the derailler mechanism in the position illustrated in FIG. 2 in solid line, the roller cage is in the far right position relative to FIG. 2 and the chain 22 is engaged with the sprocket wheel 21. If the sprocket wheels 17, 18, 19, 20, and 21 are rotating, a derailler can move the roller cage 23 to the left relative to FIG. 2 so that the chain will be shifted between the sprocket wheels as shown in FIG. 3, wherein the chain has been shifted to sprocket 17, and it is noted under these conditions, the members 37 and 51 act as a single lever under actuation of the cable 64.

However, if the bicycle is not moving and an attempt is made to shift the derailler, the roller cage will be locked by the chain and sprocket wheel and cannot move, however, the cable 64 will not be stretched or broken under these conditions, but the member 51 will pivot about the pin 49 to the dotted position illustrated in FIG. 2 and FIG. 4 while the roller cage 23 remains in the position illustrated in FIG. 2. However, the spring between the members 37 and 51 will apply spring bias to the member 37 such that when the bicycle starts to move after shifting has occurred, the spring bias will cause the parallelogram and the roller cage to move to the left relative to FIGS. 2 and 3 thus completing the shifting as the bicycle starts to move even though the actuating lever 51 has already been placed in the shifted position.

The result of the invention is that breaking of the cable and stretching of the cable and/or breaking of the linkage mechanism will not occur as in deraillers of the prior art and the provision for the spring connection between the members 37 and 51 provides an automatic fail-safe feature that prevents injury and destruction to the mechanism.

Although the invention has been described with respect to preferred embodiments, it is not to be so limited as changes and modifications may be made therein which are within the full intended scope as defined by the appended claims.

I claim as my invention:

1. A rear derailler mechanism for moving the drive chain of a bicycle having at least two sprocket wheels connected to the rear wheel comprising, a generally channel-shaped housing member attached to said bicycle adjacent the rear wheel, a parallelogram linkage mechanism comprising three links with two links having first ends pivotally connected to said channel-shaped housing member and the third link with its opposite ends pivotally connected to the second ends of said two links, a chain engaging roller cage supported by said parallelogram, a control cable mounted on the bicycle and movable to at least two positions, an actuating link pivotally connected to said housing member, a first spring means connected between said actuating link and said housing, and a second spring means connected between said actuating link and said parallelogram, wherein said first and second spring means allow said actuating link to move said parallelogram relative to said housing when said cable is moved unless the parallelogram is blocked, under which condition said actuating link moves against said first spring means as said parallelogram remains stationary.

2. A rear derailler mechanism for a bicycle according to claim 1 wherein said actuating link engages one of said two links and stop surfaces formed on said actuating link and said one of said two links to limit the rotary movement between them in one direction.

3. A rear derailler mechanism for a bicycle according to claim 2 comprising first adjustable stop means for limiting the movement of said parallelogram in a first rotary direction relative to said housing.

4. A rear derailler mechanism for a bicycle according to claim 3 comprising second adjustable stop means for limiting the movement of said parallelogram in a second rotary direction relative to said housing.

5. A rear derailler mechanism for a bicycle according to claim 2 including a third spring means mounted between said parallelogram and said roller cage.

6. A rear derailler mechanism for a bicycle according to claim 5 including means for adjusting the spring tension of said third spring means.

* * * * *